United States Patent Office 2,762,291
Patented Sept. 11, 1956

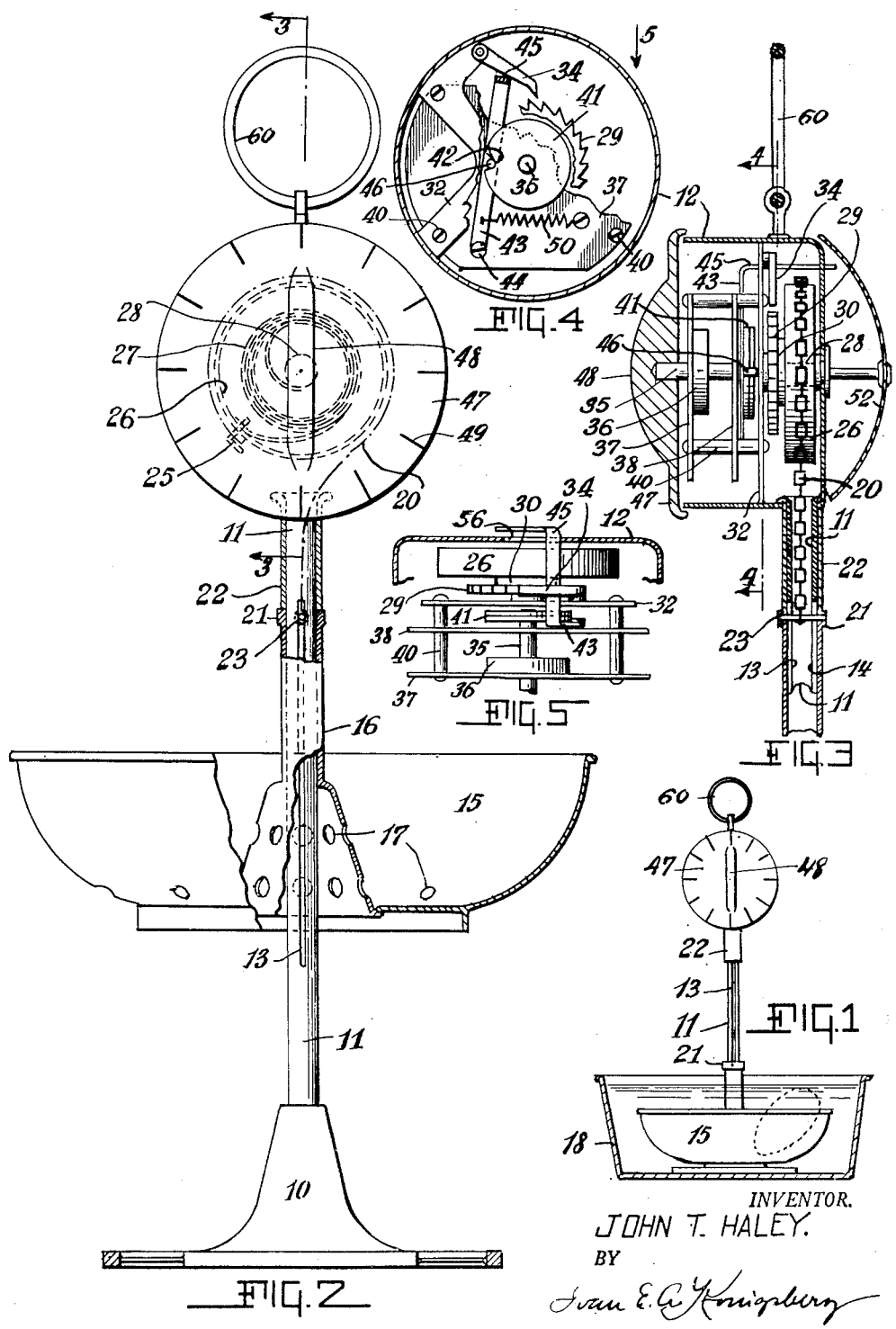

2,762,291

TIMING DEVICE FOR BOILING EGGS

John T. Haley, Brooklyn, N. Y.

Application February 16, 1954, Serial No. 410,528

1 Claim. (Cl. 99—336)

This invention relates to improvements in timing devices for boiling eggs or the like. One object of the invention is to provide a device which may be set to automatically lift a basket with eggs out from a pan of boiling water at a predetermined time. Another object of the invention is to provide such a device in the form suitable for use as a household appliance in that the device may be placed in a pan of boiling water and when the eggs have been boiled for a given length of time, the device may be lifted out of the pan and carried to a table for use.

Still another object of the invention is to provide an egg boiling device which comprises a clockwork which is set and started to operate or run so as to cause a ratchet mechanism to operate to remove the previously submerged eggs from the boiling water. Another object of the invention is to provide an egg cooker of simple practical construction and design which may be manufactured relatively inexpensively and sold as an everday household appliance.

With the foregoing and other ancillary objects in view the invention is embodied in an egg cooker as hereinafter described and claimed and as illustrated in the accompanying sheet of drawing in which Fig. 1 is an outline illustration of a timing device according to this invention showing the egg basket submerged in a pan of water.

Fig. 2 is a view in elevation with parts in section and parts broken away, showing the device with the egg basket in its upper position.

Fig. 3 is a sectional view of the clockwork and basket operating means and taken on the line 3—3 of Fig. 2.

Fig. 4 is a partial sectional view on the line 4—4 of Fig. 3 showing the ratchet mechanism and parts of the clockwork.

Fig. 5 is a view with parts in section of some of the elements in the clockwork mechanism and looking in the direction of the arrow 5 in Fig. 4.

The device comprises a supporting stand, an egg basket and a clockwork controlled mechanism for raising the basket with eggs out of a pan of boiling water after a given length of time. The stand consists of a foot 10 with an upright tube 11. The latter supports at its top a housing 12 which encloses the operating mechanism. The tube 11 is slotted, front and back, as shown at 13 and 14 in Fig. 3. A suitable egg basket 15 has a tubular hub 16 which slides upon and encloses the tube 11. The basket and hub have perforations 17 for the circulation of the water about the eggs. The basket is manually lowered into a pan 18 of boiling water and elevated or raised out of the pan by a chain 20 to the position shown in Fig. 2 where the lifting movement is stopped by a collar 21 on the hub 16 striking against a sleeve 22 which extends downwardly from the housing 12. The free end of the chain 20 is secured to the hub and thereby to the basket by a pin 23 which extends across the tube 11 through the slot 13 and 14 therein.

The other end of the chain 20 is secured as at 25, Fig. 2, to a spring housing 26 containing a helical spring 27. The outer end of the spring is fastened to the housing 26, for example, at the point 25. The inner end of the spring is secured to a non-rotatable ratchet shaft 28 which supports a ratchet 29. The spring housing and the ratchet are secured to move together by any suitable means as indicated as a washer 30 in Figs. 3 and 5. The ratchet shaft may be supported in the housing 12 and in a spider bracket 32 in the housing.

The spring 27 tends to rotate the spring housing 26 and the ratchet 29 in a counterclockwise direction upon the shaft 28 whereby to wind up the chain 20 upon the housing to raise the basket 15. This happens when the ratchet is free to rotate. When the chain is unwound from the housing to lower the basket the spring housing and the spring are rotated clockwise. The spring is then wound up and tensioned.

The rotative movements of the ratchet 29 are controlled by a pivoted ratchet pawl 34, Fig. 4. During the unwinding of the chain 20, when the basket 15 is lowered, the ratchet rotates freely clockwise under the pawl in the usual manner of ratchet and pawl devices. The counterclockwise rotation of the ratchet to wind up the chain and raise the basket out from the pan is however, prevented by the ratchet pawl 34 which engages the ratchet for a given length of time, the pawl dropping into engagement with the ratchet by means of gravity or a spring, not shown.

The length of time during which the pawl prevents rotation, counterclockwise, of the ratchet is therefore the length of time for which the clockwork is set to run or the length of desired cooking time.

The clockwork may be of any usual construction, the details and operation of which are common knowledge and not specially described herein. For the purposes of this disclosure the clockwork is identified by its main spindle 35 and its spring 36. These and other parts of the clock mechanism are in known manner supported by front and rear clock plates, 37, 38 held together by screws 40. The latter may be extended rearwardly for the support of the spider bracket 32.

The clockwork spindle carries a cam 41 having a notch 42. A pawl lever 43 is pivoted on the clock plate 37 at 44. The top of the lever is bent to form a finger 45 which extends in under the ratchet pawl in engagement therewith and rearwardly through a slot 56, Fig. 5, in the housing 12 for engagement with a bell 52, Fig. 3. The pawl lever has a pin 46 adapted to enter the notch by force of the spring 50. The clock spindle extends forwardly and carries a dial 47 with a finger grip 48. The dial is graduated as at 49 for egg time boiling intervals. All such graduations are not shown.

When the device is not in use the clock is not running because the pawl lever pin 48 is then seated in the notch 42 of the cam 41, the clock then having previously run the desired length of time. The basket is now in its upper position.

In operation, when the water in the pan 18 is boiling, the device with eggs therein is placed in the water. The user then takes hold of the grip 48 and rotates the dial according to the desired cooking time indicated by the dial graduations. As the dial is turned by the user, the clock spindle is rotated clockwise with the cam 41— counter clockwise in Fig. 4 because the cam is seen from the rear—whereby the pin 46 is moved out of the notch 42 and the clock is free to start running. When the pawl lever is thus moved away from the cam, the lever finger 45 is moved from under the pawl. The latter therefore now drops upon the teeth of the ratchet and prevents rotation thereof and consequent raising of the basket with the eggs until the clock has run the desired length of time, when the cam will have been rotated so far that the notch is opposite the pawl lever pin and the latter will enter the notch and stop the clock.

The basket with the eggs will now be lowered into the water by the user pushing down upon the upper end of the hub 16. The basket hub being connected with the chain by the pin 23 moves the pin downward in the slots 13, 14 in the tube 11 and unwinds the chain. The unwinding of the chain causes rotation of the spring housing 26 and the ratchet and the spring is tensed. The ratchet teeth merely run under the pawl in the usual manner.

When the time is up, the clock stops running because of the engagement of the pawl lever pin with the cam notch. The pawl lever finger therefore moves back to lift the pawl from the ratchet and at the same time strike the bell to give a signal that the cooking time is up. The ratchet is now free to rotate and the ratchet spring will rotate the spring housing to wind up the chain to raise the basket. The device may then be carried about by taking hold of the handle 60 and removing the device for use of the boiled eggs.

Inasmuch as many of the details of construction herein disclosed may be modified, I claim all such changes and modifications as may come within the scope of the appended claim.

I claim:

A timing device for boiling eggs comprising an upright tubular support, a housing secured to the upper end of the support, an egg basket mounted to slide vertically upon said support from a normal upper inoperative position to a lower operative position and back again; a rotatable chain winding mechanism including a ratchet mounted upon and within the said housing; a chain movable within said tubular support and connected to and between said mechanism and said basket; means for rotating said chain mechanism to wind up the chain to raise the basket from its operative position; a spider bracket secured within said housing, a movable pawl pivoted on said spider bracket and engaging said ratchet to prevent accidental chain unwinding movement of said chain winding mechanism after the basket has been raised as aforesaid by the winding up movement of the chain; a clockwork mounted within said housing; a pivoted pawl lever operatively engaging said clockwork to keep the same normally inoperative; said pawl lever engaging said pawl to disengage the pawl from the said ratchet to release said chain mechanism when the basket is to be lowered; movable manual time setting means operatively connected with said clockwork to start the same operating for a given length of time when the basket is to be lowered to its operative position and simultaneously therewith move the said pawl lever out of engagement with said clockwork and away from the said pawl to release the said pawl for subsequent engagement with the said ratchet to prevent chain winding up movement of said chain mechanism when the basket is to be lowered; manual means for lowering the basket to its operative position after said clockwork has become operative and a spring connected to said pawl lever for moving the same back into operative engagement with the clockwork after said given length of time has elapsed, said pawl lever simultaneously therewith disengaging the pawl from the ratchet to release said chain mechanism to wind up the chain and raise the basket, a signal bell secured to said housing, said pivoted pawl lever having a finger extending through a slot in said housing for engagement with said signal bell when said pawl lever is actuated by the said spring as aforesaid.

References Cited in the file of this patent

UNITED STATES PATENTS

| 607,930 | Holmes | July 26, 1898 |
| 750,072 | Anderson | Jan. 19, 1904 |
| 1,876,072 | Noonan | Sept. 6, 1932 |
| 2,088,499 | Warner | July 27, 1937 |

FOREIGN PATENTS

| 16,752 | Great Britain | 1914 |
| 71,171 | Switzerland | Dec. 1, 1915 |
| 243,151 | Germany | July 30, 1911 |
| 738,932 | France | Oct. 24, 1932 |